Patented Apr. 3, 1923.

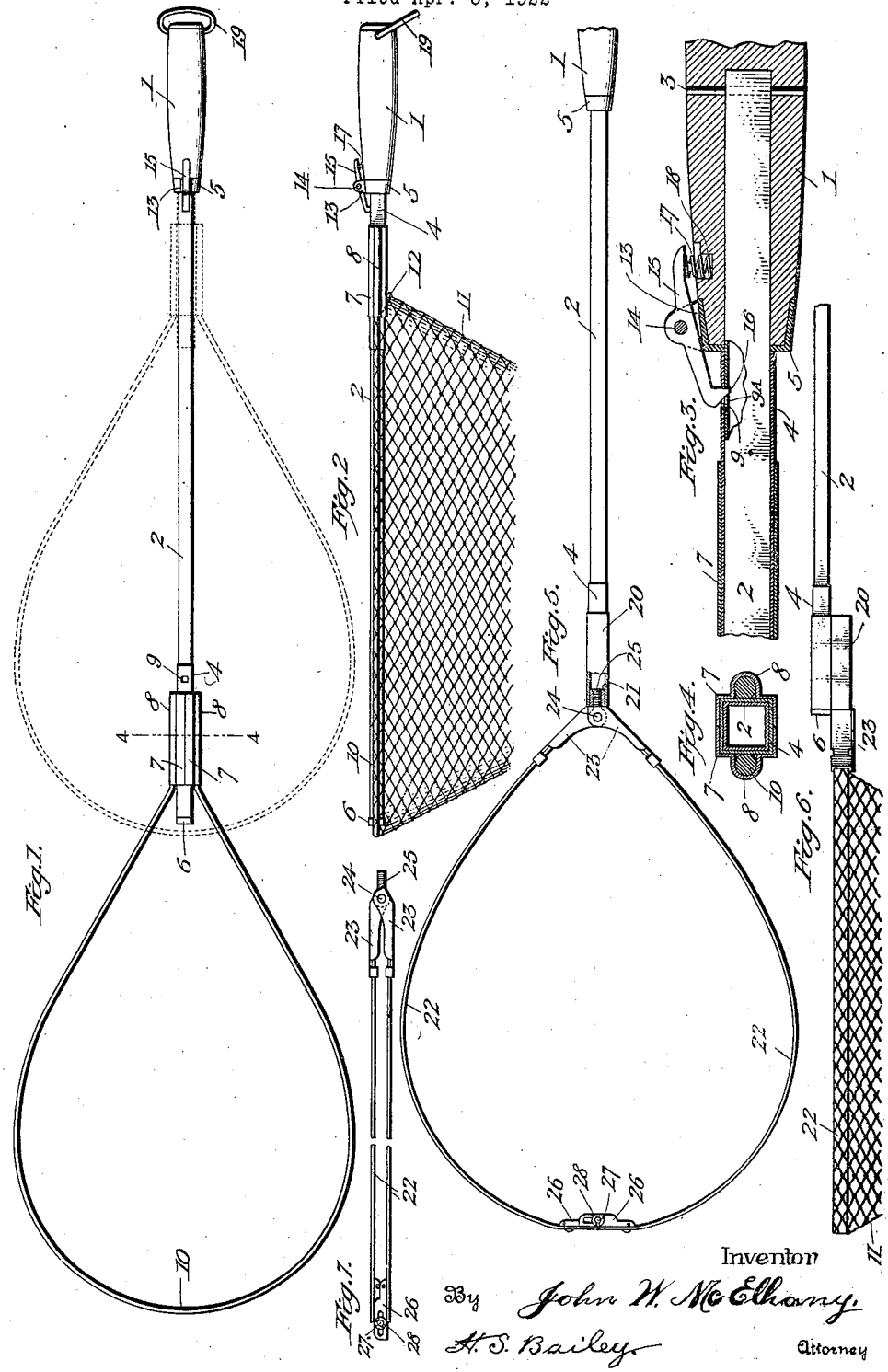

1,450,322

UNITED STATES PATENT OFFICE.

JOHN W. McELHANY, OF DENVER, COLORADO.

HAND-OPERATING EXTENSIBLE FISH-LANDING NET AND HANDLE.

Application filed April 8, 1922. Serial No. 550,716.

*To all whom it may concern:*

Be it known that I, JOHN W. McELHANY, a citizen of the United States of America, residing at the city and county of Denver and State of Colorado, have invented a new and useful Hand-Operating Extensible Fish-Landing Net and Handle, of which the following is a specification.

My invention relates to a hand operating extensible fish landing net and handle for fishermen.

And the objects of my invention are:

First. To provide an extensible handle and fish-landing-net for fishermen, especially for those wading in rivers, creeks, and for lake and sea-shore and boat fishing.

Second. To provide a hand operating, combined fish-landing-net and its supporting ring and rod, that is slidably mounted on a handle of predetermined length, that is arranged to allow said net and its ring and rod to be moved and held alongside of and within the length of the handle, but that can be released and instantly be slidingly moved along the handle and be extended beyond it by a quick downward movement of the hand of the operating fisherman.

Third. To provide a normally short, simple, inexpensive fish-landing-net and handle that can be carried by fishermen and that can be quickly extended to form a long handled fish-landing-net when it is desired to use it to net and land a fish.

Fourth. To provide a fish-landing-net and handle that is composed of two slidably connected parts that are arranged to form a combined short, fish-landing-net and handle, the two telescoping parts of which can be releasably locked together when not in use, but which are arranged to be instantly unlocked by the hand of the fisherman while holding it, and the net can be extended beyond the handle far enough to form a long handled fish-landing-net, and the one-piece ring and its net and also the collapsible ring and its net are drawn back to the handle and locked there after a fish has been netted and landed, and kept until another fish is ready to be netted and landed when it is again released and extended.

I attain these objects by the mechanism illustrated in the accompanying drawings, in which:

Figure 1 is a plan view of a telescoping fish-landing-net and handle embodying my invention.

Fig. 2 is a side view of the same, the slidable member which carries the net-supporting ring being slid back on its supporting rod to abut against the handle, and is retained in this position by a spring latch.

Fig. 3 is a sectional view, full size, of a portion of the handle and the rod extending therefrom, and showing more clearly the manner of locking the slidable member in its retracted position.

Fig. 4 is a sectional view on the line 4—4 of Fig. 1.

Fig. 5 is a bottom plan view of a landing net and handle having the slidable support to which the net ring is attached, but showing a collapsible and detachable net ring.

Fig. 6 is a side view of a portion of Fig. 5. And

Fig. 7 is a plan view of the collapsible ring detached from its support, and folded so that the two sides thereof are parallel and close together.

Referring to the accompanying drawings:

The numeral 1 indicates the handle or hand grip of the improved device, and 2, a rod of suitable length for the purpose intended, one end of which is inserted in the handle and is secured therein by a pin 3, which passes through the handle and through the rod. The rod 2, is preferably square in cross section, and is also preferably hollow to reduce weight. Upon the rod 2, is slidably mounted a short sleeve or section of square tubing 4, the inward movement of which is defined by a ferrule 5, on the adjacent end of the handle while its outward movement is defined by a shoulder 6, which is formed on the outer end of the rod 2.

Upon the slidable sleeve 4, are soldered two members 7, which taken together are square in cross section, with the exception that the wide side of each of these members is stamped or bent to form therein an outwardly bulging longitudinal channel 8, which is semi-circular in cross section, as clearly shown in Fig. 4.

The slidable sleeve 4, is slightly longer than the members 7, so as to extend slightly beyond each end of the said members, and the upper side of the extended end of the sleeve, next the handle, is provided with a hole 9, which is adapted to receive a spring catch, as will be later explained.

Within the channels 8, are secured the free ends of an elongated ring 10, the opposite members of which are straight and divergent for a short distance from the channels, and then merge into the curved ring portion, as shown in Fig. 1. This ring 10, supports an inverted cone-shaped landing net 11, which is of sufficient depth to insure the safe landing of fish, said ring passing through the top row of meshes of the net.

An eye 12, is secured upon the under side of the slidable sleeve 4, to which that portion of the net which passes under the said sleeve may be secured, thus preventing the sagging of the net at this point.

By extending the end of the sleeve 4, slightly beyond the point where the free ends of the ring 10, enter the channels 8, the danger of the net being caught between the end of the sleeve and the shoulder 6, on the outer end of the rod 2, is prevented. The ferrule 5, is provided with ears 13, in which a pin 14, is supported upon which a catch 15, is pivotally mounted midway of its length. The forward end of this catch terminates in a depending lock 16, the front edge of which is inclined and its rear end rests upon an expansion coil spring 17, which is housed in a socket or recess 18, in the handle. When the slide 4, carrying the ring 10, and net 11, is moved back to the position shown in Fig. 2, the rear end of the slide or sleeve, engages the inclined edge of the hook 16, of the catch, and forces the catch up against the tension of the spring 17, thus permitting the end of the slide to engage the end of the ferrule 5, and immediately the spring acts to rock the catch so that its hooked end 16, enters the opening 9, in the end portion of the sleeve, and also a corresponding opening 9A, in the hollow rod 2, whereby the slide is locked in the position shown in Fig. 2, in which position the landing net is out of commission and the whole device may be conveniently carried by the fisherman by suspending the same from a hook secured to his belt or to some part of his clothing, the handle being provided with a ring 19, for this purpose.

In Figures 5, and 6, I have shown a device comprising the same form of handle 1, rod 2, and slidable sleeve 4, as are shown in Figures 1 and 2, but in these figures is shown a detachable and collapsible net supporting ring which is carried by the slidable sleeve in the following manner:

Upon the under side of the sleeve is soldered a piece of square tubing 20, in the forward end of which is secured a metal plug or block 21, having a threaded aperture. The net supporting ring comprises two flat resilient straight metal members 22, to the inner end of which are riveted channeled hinge plates 23, the free ends of which overlap and are pivotally connected by a pin 24, which also passes through the head of an eye bolt 25, which is adapted to be screwed into the block 21, in the end tube section 20, as shown in Fig. 5.

To the outer ends of the ring members 22, are riveted slotted locking plates 26, which extend a short distance beyond the ends of the said members and are connected by a bolt 27, upon which is screwed a jam nut 28. When the members 22, are bowed and their outer ends pulled in opposite directions as far as the ends of the slots in the plate 26, permit, the end of the plate on each member will swing past the end of the other member, and then by pushing the ends of the members toward each other, the extended end of each plate will slide behind the end of the other member thereby locking the strips 22, in operative position, as shown in Fig. 5. When it is desired to remove the collapsible net ring, it is unscrewed from the tube section 20, and the outer ends of the two members 22, are drawn apart so that the end of each locking plate 26, passes from behind the end of the adjoining member 22, and the said members 22, are pressed into parallel relation, so that the net can be wound about them, thus forming a compact body which can be easily carried in a pocket, or placed in a valise or suit case.

In practice, when the device is not being used, the slide is moved back on the rod 2, to the position shown in Fig. 2, in which position it is automatically locked by the catch 15, and the device is hooked in an accessible position to the belt or some part of the clothing of the fisherman by means of the ring 19, as previously described.

When it is desired to net a fish, the handle 1, of the device is grasped and the thumb is pressed down upon the catch 15, thereby releasing the slidable sleeve 4, which carries the ring and net, and when the rod 2, is swung downward the sleeve 4, will slide forward on the rod until stopped by the shoulder 6, when the net is in position for landing the fish.

After the fish has been landed, the slide is again moved back and locked in the position shown in Fig. 2, which position represents the shortest length of the device, and it may then be conveniently carried by the fisherman without interfering with the movements of his arms or legs.

Thus the device when in use is sufficiently long for conveniently netting fish, and when not in use may be so reduced in length as to be carried without inconvenience.

Having described my invention, what I claim as new and desire to secure by Letters Patent is:

1. In a device of the character described, the combination with a handle having a hollow rod extending therefrom which is square in cross section and provided with a stop on its outer end; of a sleeve slidably mounted on said rod, having a hole in its upper side, and a ring-like member secured thereto, upon which is secured a fish landing net; a spring actuated lever pivotally mounted on said handle having a hook on its forward end which automatically engages the hole in said sleeve when the same is slid back against the handle, thereby to lock said net supporting ring in an inoperative position, said lever being manually rocked to release said sleeve, whereby the same may slide forward on said rod and against said stop.

2. In a device of the character described, the combination with a handle having a rod extending therefrom which is provided with a stop at its outer end, of a slide on said rod having longitudinal channels on its opposite sides, a ring-like member the free ends of which are secured in said longitudinal channels, a fish landing net attached to said ring-like member, and a spring catch on said handle for automatically engaging and holding said slide when the same is moved back against the handle.

3. In a device of the character described, the combination with a handle having a rod extending therefrom which is provided with a stop on its outer end, said rod being square in cross section, of a slide mounted on said rod of a corresponding shape in cross section, and having longitudinal outwardly curved channels on opposite sides thereof, a ring-like member the free ends of which are secured in said channels, a fish landing net attached to said ring-like member, and a spring actuated catch on said handle for engaging said slide when the same is moved back against the handle.

In testimony whereof I affix my signature in presence of two witnesses.

JOHN W. McELHANY.

Witnesses:
G. SARGENT ELLIOTT,
ELIZABETH SMITH.